United States Patent
Boucherie

(10) Patent No.: US 6,733,264 B2
(45) Date of Patent: May 11, 2004

(54) TOOL FOR INJECTION MOLDING OF TOOTHBRUSHES

(75) Inventor: Bart Gerard Boucherie, Izegem (BE)

(73) Assignee: G. B. Boucherie N.V., Izegem (BE)

( * ) Notice: Subject to any disclaimer, the term of this patent is extended or adjusted under 35 U.S.C. 154(b) by 112 days.

(21) Appl. No.: 09/837,332

(22) Filed: Apr. 19, 2001

(65) Prior Publication Data

US 2001/0033875 A1 Oct. 25, 2001

(30) Foreign Application Priority Data

Apr. 20, 2000 (DE) .................... 200 07 304 U

(51) Int. Cl.$^7$ .................... B29C 45/06; B29C 45/16
(52) U.S. Cl. .................. 425/134; 425/185; 425/576; 425/805
(58) Field of Search ................ 425/134, 805, 425/185, 576

(56) References Cited

U.S. PATENT DOCUMENTS

| | | | | |
|---|---|---|---|---|
| 2,520,263 A | * | 8/1950 | Vinal ......................... | 264/161 |
| 5,609,890 A | * | 3/1997 | Boucherie ................... | 425/120 |
| 6,051,176 A | * | 4/2000 | Boucherie ................... | 264/250 |
| 6,379,139 B1 | * | 4/2002 | Boucherie ................ | 425/129.1 |

FOREIGN PATENT DOCUMENTS

| | | |
|---|---|---|
| DE | 41 27 621 | 2/1993 |
| DE | 195 22 122 | 1/1997 |
| DE | 299 17 164 | 3/2001 |
| EP | 0 678 368 | 10/1995 |
| EP | 0 836 923 | 4/1998 |
| FR | 2 724 343 | 3/1996 |

* cited by examiner

*Primary Examiner*—Robert Davis
*Assistant Examiner*—Joseph S Del Sole
(74) *Attorney, Agent, or Firm*—Stuart J. Friedman

(57) ABSTRACT

A tool for injection molding of toothbrush bodies of two different plastics components comprises two mold parts which can be moved relative to each other and together constitute four groups of parallel mold cavities. One of the mold parts has a recess for each group of mold cavities. A mold insert fits into the recess. Partial cavities are formed in the mold inserts, which partial cavities each correspond to a head portion of a toothbrush body. A first plastics component is injected into a first pair of groups of the mold cavities and a second plastics component is injected into a second pair of groups of the mold cavities. The mold cavities of the first pair of groups are arranged on the one side and those of the second group are arranged on the other side of a rotatable carrier arm to which the mold inserts are fastened. The mold cavities are arranged in each group parallel to each other and so as to have the same orientation. The mold cavities of the first pair of groups are arranged so as to lie opposite to those of the second pair of groups and, with respect to the center of motion of the carrier arm, so as to be point-symmetric to the mold cavities of the second pair of groups.

1 Claim, 2 Drawing Sheets

US 6,733,264 B2

TOOL FOR INJECTION MOLDING OF TOOTHBRUSHES

FIELD OF THE INVENTION

The invention relates to a tool for injection molding of toothbrush bodies of at least two different plastics components injection-molded in succession.

BACKGROUND OF THE INVENTION

A tool for injection molding of toothbrush bodies of two different plastics components injection-molded in succession is known from EP 0 678 368 A1. It comprises two mold parts which can be moved relative to each other and together constitute a plurality of groups of parallel mold cavities. One of the mold parts comprises a recess for each group of mold cavities, a mold insert being insertable into the recess. Partial cavities are formed in the mold inserts, these cavities corresponding to the head portion of the toothbrush bodies. The first plastics component is injected into two of in total four groups of mold cavities and the second plastics component is injected into the two remaining groups. After injection of the first plastics component the mold inserts with the molded blanks adhering thereto are lifted from the mold cavities and placed in the mold cavities of the other pair of groups, for injection of the second plastics component.

The mold inserts are arranged on the periphery of a circular turning disc by means of which the mold inserts can be moved between the groups of mold cavities. With that results an arrangement for the mold cavities which generally points radially away from the center of the turning disc. Between the groups of mold cavities remains an area on the mold parts which is not made use of.

BRIEF DESCRIPTION OF THE INVENTION

The invention makes possible a much more compact arrangement of the groups of mold cavities.

The tool according to the invention has two mold parts which can be moved relative to each other and together constitute at least two groups of parallel mold cavities, and further comprises a rotatable carrier arm mounted for rotation about the axis. One of the mold parts comprises a recess for each group of mold cavities, a mold insert being insertable into the recess. Partial cavities are formed in the mold inserts, which partial cavities each correspond to a head portion of the toothbrush bodies. A first one of the plastics components is injected into a first one of the groups of mold cavities and a second one of the plastics components is injected into a second one of the groups of mold cavities. The mold cavities of the first and second groups are arranged on opposite sides of the rotatable carrier arm, the mold inserts being attached to the carrier arm. The mold cavities are arranged in each group parallel to each other and so as to have an identical orientation. The mold cavities of the first group are arranged so as to lie opposite to the mold cavities of the second group and, with respect to the axis of the carrier arm so as to be point-symmetric to the mold cavities of the second group.

The invention makes it possible to arrange many grouped mold cavities in a space-saving way and close to the center, so that the mold part in which the cavities are formed only has to have a relatively small radial extent. On the whole, there results a reduction in mass and a favorable mass distribution, close to the center, of the mold part. Arranging the groups of mold cavities close to the center allows also a simpler configuration of the heating conduit system. Opening the tool, in particular the lifting of the carrier arm with the mold inserts attached thereto, is facilitated by the compact arrangement, according to the invention, of the groups of mold cavities, because no excessive leverages occur due to the inserts being close to the center.

DETAILED DESCRIPTION OF THE PREFERRED EMBODIMENTS

Figure 1:
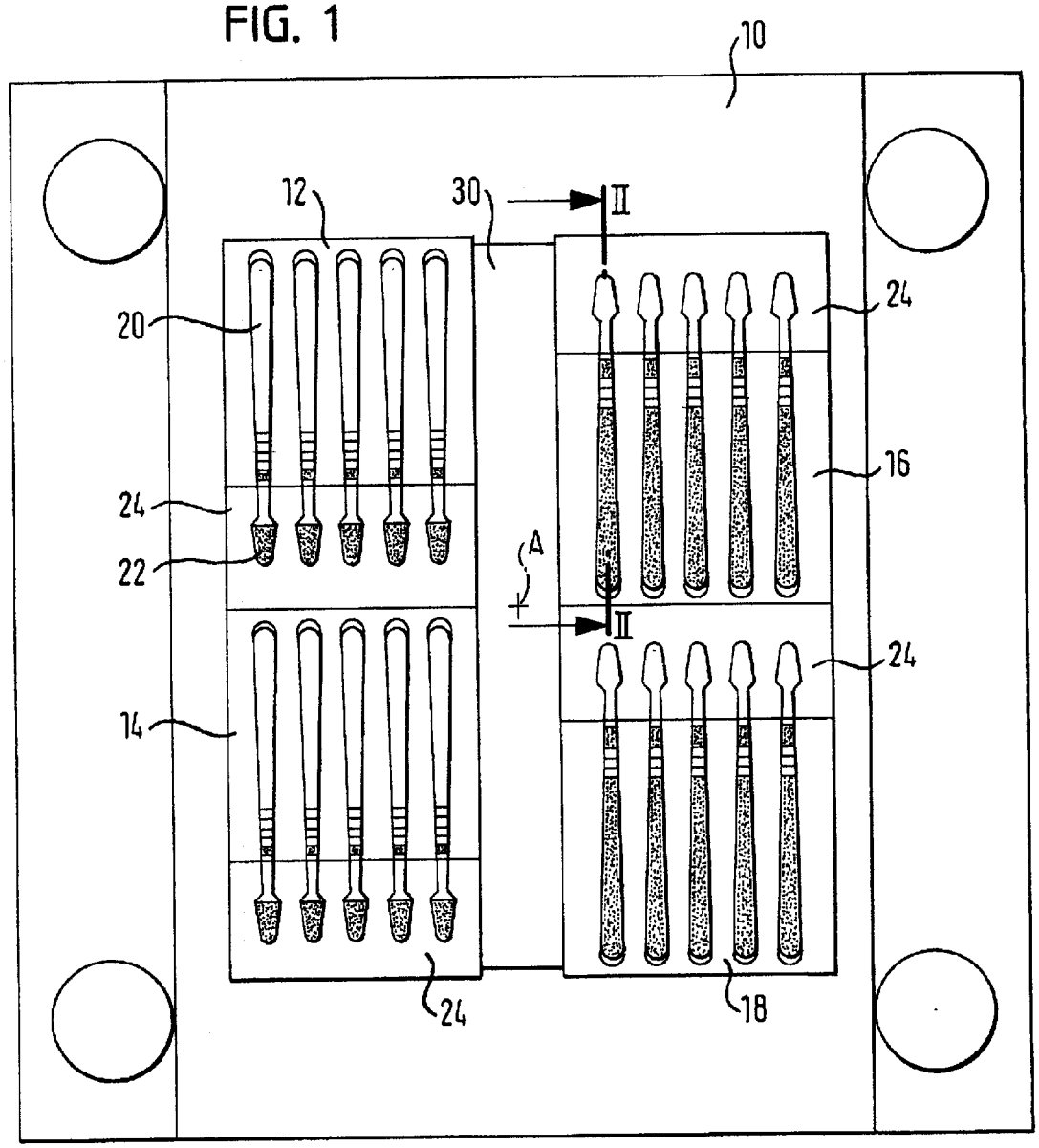
FIG. 1 shows a top view of a mold part of a first embodiment of the tool.
Figure 2:
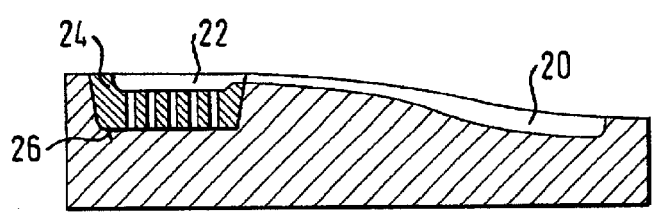
FIG. 2 shows a section along line II—II in FIG. 1.

A first embodiment of the tool for injection molding of toothbrush bodies has two parts which can be moved relative to each other, of which in FIG. 1 the lower one, referenced by 10, is shown in top view. The tool part 10 comprises four subgroups of mold cavities 12, 14, 16, 18. Each subgroup of mold cavities comprises in the embodiment shown here five parallel cavities having an identical orientation. As can be seen from FIG. 2, each mold cavity consists of a first section 20 substantially corresponding to the brush handle and of a second section 22 substantially corresponding to the brush head. The section 22 is formed in a mold insert 24 which is matingly inserted into a recess 26 of the tool part 10.

The pair of subgroups 12, 14 constitutes a first group of mold cavities in which the base bodies are injection-molded from a first plastics, for instance polypropylene. The pair of subgroups 16, 18 constitutes a second group of mold cavities in which the base bodies injection-molded in the first group are provided in sections with a second plastics by injection molding, for instance an elastomer. All mold cavities of one group are arranged parallel to each other, the orientation of the mold cavities of the first one of the groups constituted by the subgroups 12, 14, however, being opposite to the orientation of the mold cavities of the second one of the groups constituted by the subgroups 16, 18. Within each of the groups the mold cavities of the one of the subgroups are arranged so as to be in alignment with those of the other one of the subgroups.

The mold inserts 24 of all four subgroups 12, 14, 16, 18 of mold cavities are attached to a common central carrier arm 30 which is rotatable about a vertical axis A. The mold cavities of the first one of the groups are arranged on opposite sides of the rotatable carrier arm 30, the mold inserts being attached to the carrier arm 30. The mold cavities as well as the mold inserts 24 of the first one of the groups are arranged, with respect to the axis of rotation A of the carrier arm 30, so as to be exclusively point-symmetric to the mold cavities of the second one of the groups and mold inserts 24, respectively. "Exclusively point-symmetric" means that there is no mirror symmetry and also no combination of point and mirror symmetry. If one considers an imaginary front of the first one of the groups, which front is defined by the alignment of the mold cavities, this is oriented so as to extend past a corresponding front of the second one of the groups, the axis of rotation A of the carrier arm lying between the two fronts.

Retaining this order principle, it is also possible to arrange more than one group of mold cavities on each side of the carrier arm 30.

The carrier arm 30 with the mold inserts 24 attached thereto can both be rotated about the axis A and displaced in the direction of this axis. When the tool is open, the mold inserts 24 are lifted, the brush bodies which have been readily molded in the subgroups 16, 18 are ejected, and the base bodies simultaneously molded in the subgroups 12, 14 are lifted, are turned about 180° by rotation of the carrier arm 30 and then placed in the mold cavities of the subgroups 16, 18. During molding the next set of base bodies in the mold cavities of the subgroups 12, 14, the base bodies which have been placed in the mold cavities of the subgroups 16, 18 are provided with the second one of the plastics component by means of injection molding.

Figure 3:
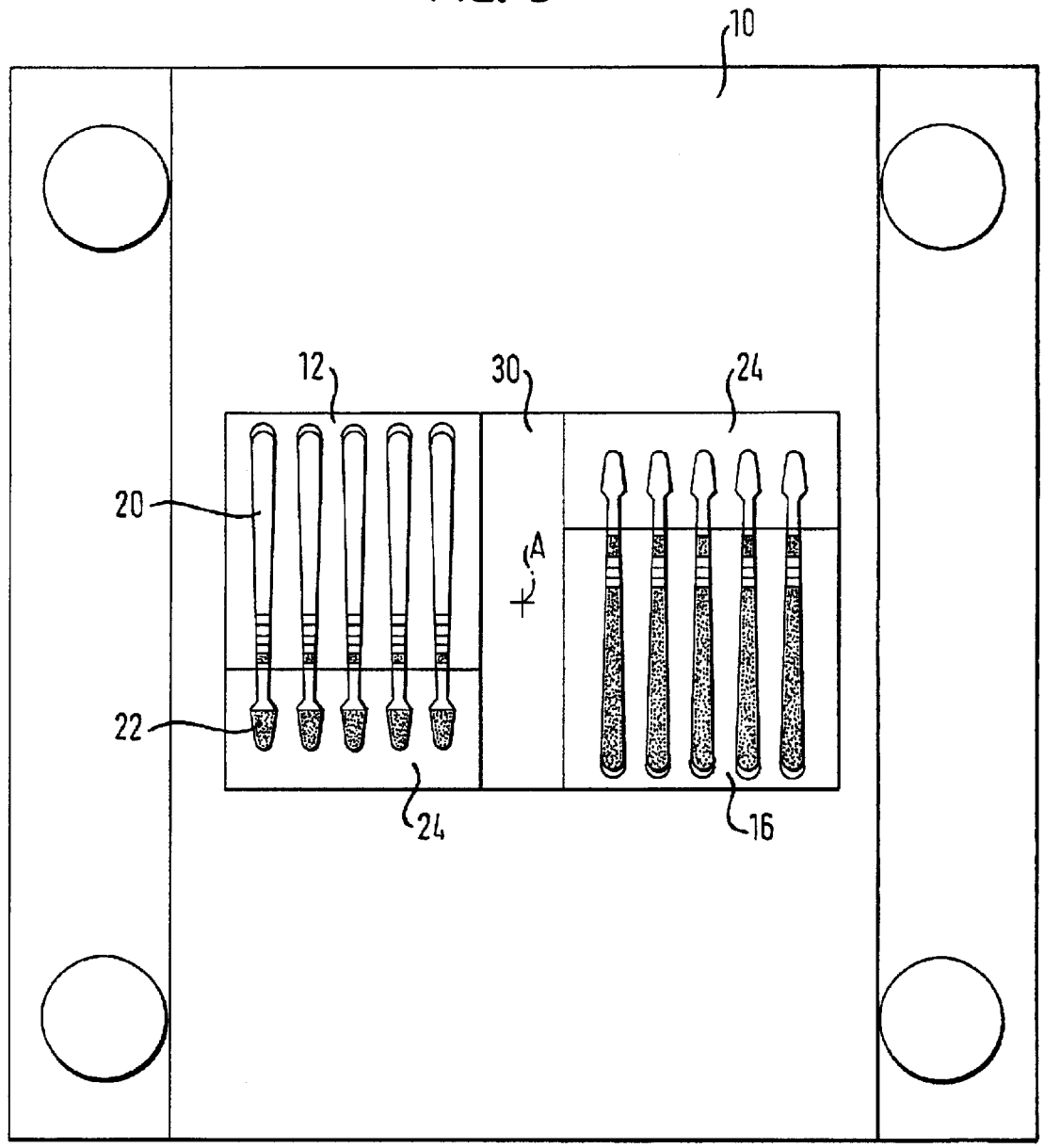
FIG. 3 shows a top view of a mold part of a second embodiment of the tool.

A second embodiment of the tool for injection molding of toothbrush bodies, of which in FIG. 3 corresponding to the view of FIG. 1 is only shown the lower mold part, differs from the first embodiment merely in that the group of mold cavities is not constituted by pairs of subgroups. The other components of the tool as well as their functions correspond to those of the first embodiment and are provided with the same reference numeral.

Amongst the advantages already initially mentioned there results particularly with this embodiment a simplified maintenance, as the mold inserts are accessible particularly easy and can be exchanged just like inset cases.

What is claimed is:

1. A tool for injection molding of toothbrush bodies of at least two different plastics components injection-molded in succession, said tool consisting of:
   a) two mold parts which can be moved relative to each other and together constitute two groups of parallel mold cavities (12, 14 and 16, 18);
   b) one of said mold parts (10) comprising a recess (26) for each group of mold cavities, a mold insert (24) being insertable into each of said recesses (26);
   c) partial cavities (22) being formed in said mold inserts (24), which partial cavities (22) each correspond to a head portion of said toothbrush bodies;
   d) said tool further comprising a rotatable carrier arm (30) being mounted for rotation about an axis (A) and defining a plane of rotation perpendicular to said axis (A), and intersecting point of said axis (A) with said plane defining a center of rotation;
   e) said mold inserts (24) being attached to said carrier arm (30);
   f) all of said mold cavities of said first group (12, 14) being arranged on a first side of said rotatable carrier arm (30) and all of said mold cavities of said second group (16, 18) being arranged on a second side of said carrier arm (30) opposite to said first side;
   g) said mold cavities in each group (12, 14 and 16, 18, respectively) being arranged parallel to each other and so as to have an identical orientation;
   h) said mold cavities of said first group (12, 14) being arranged so as to have an opposite orientation with respect to said mold cavities of said second group (16, 18);
   i) a first one of said groups of mold cavities (12, 14) being defined by all mold cavities into which a first one of said plastics components is injected;
   j) a second one of said groups of mold cavities (16, 18) being defined by all mold cavities into which a second one of said plastics components is injected;
   k) each of said first (12, 14) and second (16, 18) groups of mold cavities comprising at least two subgroups of mold cavities (12, 14 and 16, 18, respectively);
   l) each mold cavity being spaced apart from an adjoining mold cavity of the same subgroup by a distance in a lateral direction;
   m) the mold cavities of a first subgroup (12 and 16, respectively) of one of said groups (12, 14 and 16, 18) being spaced apart from the mold cavities of a second subgroup (14 and 18, respectively) of the same group by a distance in a direction perpendicular to said lateral direction; and
   n) said mold cavities of said second group (16, 18) being arranged so as to be an exclusive image of said mold cavities of said first group (12, 14) according to a single point reflection with respect to said center of rotation, said mold cavities of said second group (16, 18) being non-symmetric to said mold cavities of said first group (12, 14) according to a single mirror reflection with respect to any line in said plane of rotation running through said center of rotation.

* * * * *